United States Patent [19]

Kulprathipanja et al.

[11] Patent Number: 4,737,165
[45] Date of Patent: Apr. 12, 1988

[54] MULTICOMPONENT MEMBRANES

[75] Inventors: Santi Kulprathipanja; Sudhir S. Kulkarni, both of Hoffman Estates; Edward W. Funk, Highland Park, all of Ill.

[73] Assignee: UOP Inc., Des Plaines, Ill.

[21] Appl. No.: 727,163

[22] Filed: Apr. 25, 1985

Related U.S. Application Data

[63] Continuation-in-part of Ser. No. 550,667, Nov. 10, 1983, abandoned.

[51] Int. Cl.⁴ .............................................. B01D 59/14
[52] U.S. Cl. ........................................ 55/16; 210/490
[58] Field of Search ................. 264/41; 210/490, 491, 210/500.2, 500.27, 650, 651, 654; 55/16, 158

[56]  References Cited

U.S. PATENT DOCUMENTS

| | | | |
|---|---|---|---|
| 2,673,825 | 3/1964 | Biefeld et al. | 154/128 |
| 3,532,527 | 10/1970 | Skiens | 106/176 |
| 4,230,463 | 10/1980 | Henn et al. | 55/16 |
| 4,454,085 | 6/1984 | Schindler et al. | 264/41 |
| 4,519,909 | 5/1985 | Castro | 210/500.27 |

*Primary Examiner*—Frank Spear
*Attorney, Agent, or Firm*—Thomas K. McBride; John F. Spears, Jr.; Raymond H. Nelson

[57] ABSTRACT

A multicomponent membrane which may be used for separating various components which are present in a fluid feed mixture comprises a mixture of a plasticizer such as a glycol and an organic polymer cast upon a porous organic polymer support. The membrane may be prepared by casting an emulsion or a solution of the plasticizer and polymer on the porous support, evaporating the solvent and recovering the membrane after curing.

18 Claims, No Drawings

MULTICOMPONENT MEMBRANES

The Government of the United States of America has rights in this invention pursuant to Contract No. DE-AC07-82ID12422 awarded by the U.S. Department of Energy.

CROSS-REFERENCE TO RELATED APPLICATION

This application is a continuation-in-part of our copending application Ser. No. 550,667 filed Nov. 10, 1983, now abandoned, all teachings of which are incorporated herein by reference thereto.

BACKGROUND OF THE INVENTION

In recent years reverse osmosis has attracted a great deal of interest for utilization in fields involving purification of liquids. This is of especial importance when utilizing this sytem in the purification of water and especially saline water. Likewise, the process is also used to remove impurities from liquids such as water or, in the field of dialysis, blood. When utilizing reverse osmosis in the purification of a saline water, a pressure in excess of the osmotic pressure of the saline water feed solution is applied to the solution which is prepared from purified water by the semipermeable membrane. Pure water thereby diffuses through the membrane while the sodium chloride molecules or other impurities which may be present in the water are retained by the membrane. Discussions and descriptions of such treatment in general and the state of art in the middle 1960's is set forth in the treatise *Desalinization by Reverse Osmosis*, the M.I.T. Press, 1966, which was edited by Ulrich Merten.

Various semipermeable membranes are now being used in commercial processes for performing separations by the reverse osmosis treatment of aqueous solutions either for the portion of relatively pure water or for concentration of a liquid solution being treated or both. Such semipermeable membranes which are being used commercially include the early Loeb-type membranes made of cellulose diacetate by processes such as described in U.S. Pat. Nos. 3,133,132 to Loeb et al. and 3,133,137 to Loeb et al. The Loeb-type membranes comprise the asymmetric type which are characterized by a very thin, dense surface layer or skin that is supported upon an integrally attached, much thicker supporting layer. Other types of semipermeable membranes which are also in use include membranes having been fabricated from polyamides, polyimides, polyphenyl esters, polysulfonamides, polybenzimidazole, polyarylene oxides, polyvinylmethyl ether and other polymeric organic materials.

It is taught in U.S. Pat. No. 4,243,701 to Riley et al. that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

The use of adsorbents or molecular sieves in separating components from fluid mixtures is also long known. In the adsorption type separation process the adsorbent exhibits selectivity of one mixture component over another or, with a molecular sieve, one component is more retained than another. The adsorbent may be employed in the form of a dense compact fixed bed which is alternatively contacted with the feed mixture and desorbent materials. In the simplest case, the adsorbent is employed in the form of a single static bed in which case the process is only semicontinuous. In another embodiment, a set of two or more static beds may be employed in fixed bed contacting with appropriate valving so that the feed mixture is passed through one or more adsorbent beds, while the desorbent materials can be passed through one or more of the other beds in the set. The flow of feed mixture and desorbent materials may be either up or down through the adsorbent.

The most commercially successful embodiment of the adsorptive type separation process is the countercurrent moving-bed or simulated moving-bed countercurrent flow system. In that system the adsorption and desorption operations are continuously taking place which allows both continuous production of an extract and raffinate stream and the continual use of feed and desorbent streams. The operating principles and sequence of such a flow system are described in U.S. Pat. No. 2,985,589 to Broughton et al.

There are numerous references which disclose the incorporation of various materials with separation membranes. U.S. Pat. Nos. 3,457,170 to Havens; 3,878,104 to Guerrero; 3,993,566 to Goldberg et al.; 4,032,454 to Hoover et al.; and 4,341,605 to Solenberger et al. teach the use of structural supports or reinforcement fibers or fabrics to aid the membrane in resisting the high pressures used in the reverse osmosis process. U.S. Pat. No. 3,556,305 to Shorr shows a "sandwich" type reverse osmosis membrane comprising a porous substrate covered by a barrier layer, in turn covered by a polymer of film bonded to the barrier layer by an adhesive polymeric layer. U.S. Pat. No. 3,862,030 to Goldberg shows a polymeric matrix having an inorganic filler such as silica dispersed throughout which imparts a network of microvoids or pores of about 0.01 to about 100 microns, capable of filtering microscopic or ultrafine particles of submicron size. U.S. Pat. No. 4,302,334 to Jakabhazy et al. discloses a membrane "alloy" comprising a hydrophobic fluorocarbon polymer blended with polyvinyl alcohol polymer which imparts hydrophilic properties to the membrane. U.S. Pat. No. 4,230,463 to Henis et al. discloses multicomponent membranes useful for separating gases comprising a polymer coating on a porous separation membrane which also may be a polymer such as a polysulfone. This patent indicates that a ratio of total surface area to total pore cross-sectional area must be at least 1000:1 as specifically set forth in claims 5 and 19. This means that the porous polysulfone which is commonly used as an ultrafiltration or reverse osmosis support cannot be utilized inasmuch as the commonly used porous polysulfone has a total area/pore cross-sectional area ratio in the range of from about 5:1 to about 900:1. In this respect, it is to be noted that the higher the ratio, the smaller is the pore diameter, i.e., a tighter membrane. As will hereinafter be shown in greater detail in the examples at the end of the specification, the relatively greater porous supports, that is, those which possess a low ratio are desirable for coating the polysulfone with a combination of silicone rubber and a glycol plasticizer. This is in contrast to prior references in which a highly porous polysulfone is coated with only silicone rubber, thus leading to a low selectivity. An additional difference which exists between the membrane of U.S. Pat. No. 4,230,463 and the membrane of the present invention is the unexpected stability of the latter with regard to selectivity. The selectivity which is enjoyed at the outset of the separation process utilizing the membrane of Henis et al. will be effective for only a relatively short period of time, inasmuch as the pressure difference will rapidly cause a deterioration of the membrane with an attendant loss of selectivity and stability.

U.S. Pat. Nos. 2,673,825, 3,532,527 and 4,454,085 disclose membranes which may be utilized in separation processes and involve the use of a glycol in the preparation of the membrane. However, in these three patents, the glycol is coagulated with water in the casting solution and therefore most, if not all, of the glycol is leached out before separation. Therefore, the glycol does not become an integral part of the membrane as is present in the membrane of this invention.

Mixed matrix membranes such as molecular sieves incorporated with polymeric membranes are also broadly disclosed in the art. In the article "The Diffusion Time Lag in Polymer Membranes Containing Adsorptive Fillers" by D. R. Paul and D. R. Kemp, *J. Polymer Sci.;* Symposium No. 41, 79–93 (1973), the specific mixed membrane used was a Type 5A (Linde) zeolite incorporated with a silicone rubber matrix. The Paul et al. article illustrates that the zeolite "filler" causes a time lag in reaching steady state permeation of the membrane by various gases due to the adsorption of the gases by the zeolite. It is taught in this article that once the zeolite becomes saturated by the permeating gas, a steady state rate of permeation through the membrane is reached so that the membrane selectivity is essentially the same as if the zeolite was not present. The Paul et al. article teaches making the mixed membrane by dispersing the molecular sieves into the fluid silicone prepolymer prior to casting.

We have discovered novel multicomponent membranes, their method of manufacture and uses for which they are uniquely suitable not disclosed by any of the known art either alone or in combination.

BRIEF SUMMARY OF THE INVENTION

This invention relates to a multicomponent membrane which is useful for separating components of a fluid mixture. More specifically, the invention is concerned with a multicomponent membrane, a process for preparing this membrane and a process involving the use thereof for the separation of components which are present in a fluid feed mixture, said membrane comprising a mixture of a plasticizer and an organic polymer cast on a porous organic polymer support.

It is therefore an object of this invention to provide a multicomponent membrane useful for separation of various components present in a fluid feed mixture.

Another object of this invention is found in a process for preparing a multicomponent membrane useful for the separation of components in a fluid feed membrane.

In one aspect an embodiment of this invention is found in a multicomponent membrane useable for the separation of components of a fluid feed mixture comprising a mixture of a glycol plasticizer having a molecular weight of from about 200 to about 600 and an organic polymer cast on a porous support, said porous support having a ratio of total surface area to total pore cross-sectional area of from about 5:1 to about 900:1.

Another embodiment of this invention resides in a method for the manufacture of a multicomponent membrane comprising a glycol plasticizer having a molecular weight of from about 200 to about 600 and an organic polymer on a porous support which comprises: (a) forming an emulsion or a solution of said glycol plasticizer with said organic polymer in a suitable solvent; (b) casting said emulsion or solution on said porous support to form a multicomponent membrane; and (c) curing said membrane at an elevated temperature for a time sufficient to evaporate substantially all of said solvent.

Yet another embodiment of this invention is found in a process for separating a first fluid component from a fluid feed mixture comprising a first component and a second component by contacting said fluid feed mixture with the upstream face of a multicomponent membrane comprising a mixture of a glycol plasticizer having a molecular weight of from about 200 to about 600 and an organic polymer on a porous support, said support having a ratio of total surface area to total pore cross-sectional area of from about 5:1 to about 900:1 at separation conditions, said first component in said feed mixture having a greater steady state permeability than said second component and recovering the permeate which emanates from the downstream face of said membrane said permeate comprising a fluid product mixture in which the proportion of said first component to second component is greater than the proportion of first component to second component in said fluid feed mixture.

A specific embodiment of this invention is found in a multicomponent membrane which comprises a mixture of a glycol plasticizer having a molecular weight of from about 200 to about 600 and silicone rubber cast upon a polysulfone support, said support having a ratio of total surface area to total pore cross-sectional area of from about 5:1 to about 900:1.

Another specific embodiment of this invention is found in a method for the manufacture of a multicomponent membrane which comprises forming an emulsion or solution of polyethylene glycol and silicone rubber in a solvent comprising trifluorotricholorethane, casting said emulsion or solution on a polysulfone support to form a multicomponent membrane and curing said membrane at an elevated temperature for a time sufficient to evaporate substantially all of said solvent.

Other objects and embodiment will be found in the following detailed description of the invention.

DETAILED DESCRIPTION OF THE INVENTION

As hereinbefore described, the present invention is concerned with multicomponent membranes which are useful in separating various components which are present in fluid feed mixtures. In addition, the invention is also concerned with a process for preparing these particular membranes as well as to processes involving the use thereof. The present invention, in a manner not known to the art, incorporates a plasticizer with an organic polymer and a porous polymeric support to create the desired multicomponent membrane and thereafter utilizing that creation in a process for separating fluid components from each other which would otherwise be difficult or impossible to separate.

It has now been unexpectedly discovered that the multicomponent membrane which forms the basis for the present invention will exhibit a stability when utilized in a process for separating these components which is not present in other membranes such as those prepared by coating a porous support with only a polymer such as silicone rubber or those which are formed by treating a porous support with a plasticizer. The multicomponent membrane of the present invention is formed by a process in which a plasticizer such as a glycol of the type hereinafter set forth in greater detail is immobilized in an organic polymer such as silicone rubber in either an emulsion or solution phase which is thereafter coated on the porous support.

Those skilled in the art of membrane separation technology know that different components of a fluid system may pass through a properly selected membrane at different rates due to different diffusivity and solubility characteristics (hereinafter collectively referred to as "permeability") of each component in the membrane. This phenomenon may be expressed in terms of a separation factor as defined in the formula:

$$\alpha A/B = \frac{(C_a/C_B)P}{(C_A/C_B)R}$$

where
- $\alpha A/B$ = separation factor;
- $(C_A/C_B)P$ = concentration of component A ÷ concentration of component B in the permeate phase (emanating from the downstream face of the membrane);
- $(C_A/C_B)R$ = concentration of component A ÷ concentration of component B in the raffinate phase (at the upstream face of the membrane).

The higher the separation factor, the better the separation that will be achieved.

We have made the discovery that when a properly selected plastizizer is incorporated with a particular membrane in a certain manner to obtain a multicomponent membrane, a surprising and unexpected increase will occur with regard to the separation factor of that membrane for a given fluid mixture. We have thus obtained by our discovery a viable process in which fluid components may be separated from a mixture because of the marked differences in their respective permeabilities through the multicomponent membrane, which marked differences do not occur in a plasticizer-free membrane.

The multicomponent membrane of our invention incorporates a plasticizer with a membrane material comprising a first organic polymer with a porous second organic polymer support such as polysulfone or cellulose acetate. The plasticizer may be any material which is included in the commonly understood meaning of that term, i.e., a chemical which imparts flexibility, workability or stretchability to the first and second polymers. The plasticizer would most likely comprise a liquid having a high boiling point and low partial pressure dispersed uniformly as an emulsion in the first polymer, or in homogeneous phase as a solution with the first polymer. The selection of specific ingredients for the multicomponent membrane will depend on the feed mixture from which the components are to be separated. For example, the feed mixture may be a liquid or a gas, but in the latter case we have found a multicomponent membrane comprising glycol having a molecular weight from about 200 to about 600 (preferably from about 5 wt. % to about 50 wt. %) incorporated with silicone rubber as the first polymer and a porous polysulfone membrane support as the second polymer to have significant utility, particularly in separating carbon dioxide from methane. In that separation, carbon dioxide is the more permeable gas.

The membrane of the present invention includes a porous organic polymer support upon which the mixture of plasticizer and first organic polymer is cast. In the preferred embodiment of the present invention, the preferred support material will comprise polysulfone although cellulose acetate may also be utilized. It is believed that the plasticizer not only has the capability of altering the permeability of the first organic polymer with which it is mixed, but it also acts on the second polymeric support material by softening it and causing its pores to shrink while at the same time facilitating the plugging of the pores with the first polymer in admixture with the plasticizer.

Separation may be effected by the present invention over a wide range of separation conditions. Ambient temperature and a moderate pressure of from about 10 psig to about 500 psig on the upstream face of the mixed matrix membrane would be entirely adequate. This is in marked distinction to the reverse osmosis processes which require that osmotic pressures be exceeded, which in some instances would reach several thousand psig. To a first-order approximation, the flux or permeation through the membrane is directly proportional to the pressure differential across the membrane.

Another aspect of our invention is the method that we have discovered to make multicomponent membranes. In its broadest embodiment the method involves forming an emulsion or solution of a plasticizer with a first organic polymer dissolved in a suitable solvent, and casting the emulsion or solution onto the porous second polymer support to obtain the multicomponent membrane. A suitable solvent, particularly when the first polymer in admixture with the plasticizer is silicone rubber, comprises a Freon which is liquid at standard temperature and pressure, such as trifluorotrichloroethane. The concentration of first polymer in solvent should be from about 0.5 wt. % to about 50 wt. % for obtaining a membrane of maximum flux capability. The emulsion or solution is preferably degassed prior to casting by exposure to at least a partial vacuum so as to minimize the formation of pinholes or voids within the membrane.

Casting in accordance with the method of the present invention is effected by pouring or spreading the plasticizer/first polymer emulsion or solution onto the porous second polymer support and curing the membrane by exposing it to an elevated temperature for a sufficient time to evaporate substantially all of the solvent.

In a less preferred, but still viable embodiment of the method of the present invention, the membrane incorporating the porous second organic polymer support may be constructed in two steps. In a first step, the plasticizer is poured or coated onto the support. In a second step, the first polymer solution is cast onto the support. Curing is then effected as discussed above.

The following examples are presented for illustrative purposes only and are not intended to limit the scope of our invention.

EXAMPLE I

Multicomponent membranes were prepared both by a conventional technique, i.e., without addition of a plasticizer, and in accordance with the method of the present invention. For the conventional method, a commercial silicone rubber was dissolved in trifluorotrichloroethane, the solution degassed by means of exposure to vacuum and the solution cast both on a glass plate and a highly porous polysulfone membrane. The cast membranes were cured at temperatures between 40° C. to 82° C. for one hour.

For the method of the present invention, about 20 to 50 percent by weight of one of the following compounds (additive): tetraethylene glycol (TEG), 600 molecular weight polyethylene glycol (PEG), propylene carbonate (PC) or propylene glycol (PG), was added to the above casting solution. The additives were emulsified in silicone rubber phase by vigorous shaking. After degassing the casting solution, the multicomponent membranes were then cured at 82° C. for one hour.

The following Table I sets forth separation factors for a $CO_2/CH_4$ separation obtained from various combinations or individual components of the above materials. The feedstream used was a 30/70, $CO_2/CH_4$ mixture and conditions included 50 psi across the membrane and 25° C.

TABLE I

| MEMBRANE | % ADDITIVE | POROUS POLYSULFONE BACKING | $\alpha$ $CO_2/CH_4$ |
|---|---|---|---|
| Sil Rub | No | No | 4.8 |
| Sil Rub | No | No | 5.0 |
| Sil Rub | No | Yes | 4.6 |
| Sil Rub | No | Yes | 4.1 |
| Sil Rub/TEG | 50 | No | 7.5 |
| Sil Rub/TEG | 43 | No | 6.4 |
| Sil Rub/PG | 47 | No | 6.4 |
| Sil Rub/PEG | 47 | No | 7.0 |
| Sil Rub/TEG | 46 | Yes | 18.5 |
| Sil Rub/TEG | 46 | Yes | 13.7 |
| Sil Rub/TEG | 47 | Yes | 12.5 |
| Sil Rub/TEG | 50 | Yes | 11.8 |
| Sil Rub/TEG | 46 | Yes | 11.0 |
| Sil Rub/TEG | 47 | Yes | 11.9 |
| Sil Rub/TEG | 50 | Yes | 12.2 |
| Sil Rub/PC | 50 | Yes | 9.62 |
| Sil Rub/PEG | 20 | Yes | 11.5 |
| Sil Rub/PEG | 47 | Yes | 10.0 |
| Porous Polysulfone | | | 1 |
| TEG Coated Porous Polysulfone | | | 6.4 |
| TEG Coated Porous Polysulfone | | | 8.8 |

It is clear from the data of Table I that the silicone rubberglycol combination yields a higher $\alpha$ than the silicone rubber alone but still far too low to be of commercial interest. When the membrane includes the porous organic polymer (polysulfone) support, as required by the present invention, the separation factors are markedly better than the supported and unsupported silicone rubber or supported glycol without polymer in admixture therewith.

Further mention is made at this point to the aforementioned U.S. Pat. No. 4,230,463 (Henis et al.) to compare the data presented therein with that shown hereinabove. In Henis et al. the separation factors for $CO_2/CH_4$ with silicone rubber cast over polysulfone may be calculated to be about 16. This would seem to compare quite favorably with the results of the membrane of the present invention cast on polysulfone until one considers the polysulfone used by Henis et al. as compared to that of the present invention. The former, as described in Henis et al. in column 21, is not unduly porous and has a large ratio of total surface area to total pore cross-sectional area. In particular, Henis et al. discloses the use of membranes having ratios of total surface area to total pore cross-sectional area of about 1000:1 (e.g., see claims 5 and 19) as opposed to the porous second organic polymer support of the present invention where such ratio may vary from about 5:1 to about 900:1. The type of membrane of Henis et al. may be conducive to high separation factors, but the rate of passage of fluid through the membrane (flux) is greatly restricted.

The polysulfone support used to obtain the data in Table I above (and in the following examples) was very porous, having a ratio of total surface area to total pore cross-sectional area of about 30:1 and with relatively large diameter pores (100–300 Angstroms). To obtain a high separation factor through use of such a support as does the present invention is indeed an achievement. The above hypothesis as to the effect of the plasticizer on the large pores, i.e., shrinking them and facilitating their plugging with polymer, is clearly borne out by the observed data.

EXAMPLE II

For this example additional tests were run on selected membranes to determine not only separation factors but also the flux in ml/min of permeate obtained from a 30/70, $CO_2/CH_4$ feed through 24 cm$^2$ of membrane of about 50 to 300 microns thickness with a differential pressure of 50 psi.

The first two tests were on a pure silicone rubber membrane and a silicone rubber membrane which included a mixture of about 20 to 50 wt. % glycols (80/20, PEG/TEG). The results were as follows:

| Membrane | Flux (ml/min) | $\alpha$ $CO_2/CH_4$ |
|---|---|---|
| Silicone rubber | 3.75 | 4.90 |
| Silicone rubber/ PEG (600 MW) + TEG (average of several runs) | 0.2–0.5 | 7.2 ± 0.4 |

This data showed a decrease in flux when plasticizer was added to the silicone rubber, but also an increase in the separation factors.

Next, polysulfone support (same as that of Example I) was incorporated into the membrane in accordance with the present invention with the following results:

| Membrane (inc. polysulfone) | Flux (ml/min) | $\alpha$ $CO_2/CH_4$ |
|---|---|---|
| Silicone rubber/TEG | 0.2–1.1 | 13.3 ± 2.6 |
| Silicone rubber/ PEG (600 MW + TEG | 0.5–1.9 | 15.4 ± 4.5 |
| Silicone rubber/ PEG (400) | 0.8–2.9 | 22.95 ± 2 |
| Porous polysulfone alone (with only 2 psi across the membrane) | very fast | ~1 |

This data showed not only a significant increase in flux when polysulfone support was added to the membrane, but also an amazing increase in separation factors. As one would expect, porous polysulfone alone is incapable of enabling a separation.

EXAMPLE III

To study the reproducibility of the performance data for various membranes, sixteen separately made membranes were tested. The first five comprised silicone rubber and a blend of PEG (600 MW) and TEG in the ratio of 80/20 (PEG/TEG) on polysulfone. The next eleven were blends of silicone rubber and PEG (400

MW) on polysulfone. The results obtained with the same feedstock and test conditions as above were as follows:

| Membrane | Flux (ml/min) | α CO$_2$/CH$_4$ |
|---|---|---|
| Silicone rubber + PEG (600) + TEG | 1.1 | 17.03 |
| Silicone rubber + PEG (600) + TEG | 1.3 | 17.02 |
| Silicone rubber + PEG (600) + TEG | 1.1 | 18.50 |
| Silicone rubber + PEG (600) + TEG | 1.6 | 6.40 |
| Silicone rubber + PEG (600) + TEG | 0.5 | 16.30 |
| Silicone rubber + PEG (400) | .85 | 24.82 |
| Silicone rubber + PEG (400) | .85 | 21.03 |
| Silicone rubber + PEG (400) | 1.42 | 25.59 |
| Silicone rubber + PEG (400) | 1.7 | 23.91 |
| Silicone rubber + PEG (400) | 1.2 | 24.08 |
| Silicone rubber + PEG (400) | 2.9 | 19.55 |
| Silicone rubber + PEG (400) | 1.9 | 19.55 |
| Silicone rubber + PEG (400) | 1.8 | 7.23 |
| Silicone rubber + PEG (400) | 1.2 | 19.19 |
| Silicone rubber + PEG (400) | 1.0 | 25.65 |
| Silicone rubber + PEG (400) | 2.2 | 21.04 |

The above data illustrates a generally high order of reproducibility of results when using samples from different batches of membranes of the present invention having the same composition. The test runs showing low flux values are attributed to use of a relatively thick membrane and the test runs showing low α's are probably due to a gross defect in the support. Membranes showing a flux of about 3.0 ml/min and an α of about 20.0 are considered to have a high degree of commercial viability.

EXAMPLE IV

One test run was made of the embodiment of the present invention where the membrane was made by first coating a porous polysulfone with the plasticizer (PEG+TEG) and then adding the polymer (silicone rubber) solution. The feedstock and test conditions were the same as in the previous examples. The data obtained (averaged over several runs) was a flux of 0.2–1.2 ml/min and an α of 12.3±3.3. Thus, even the less preferred method of making the membrane of the present invention will produce a potentially useful membrane.

EXAMPLE V

A final study was made concerning the use of porous cellulose acetate as a membrane support. The membrane, in addition to that support, included silicone rubber and PEG (400 MW) plasticizer. The feedstock used was $CO_2$ and $CH_4$ in a ratio of 30 to 70, respectively, and the pressure differential across the membrane was 95 psi. The following data was obtained using membranes of the above composition from four different batches.

| Batch No. | Flux (ml/min) | α CO$_2$/CH$_4$ |
|---|---|---|
| 1 | 0.6 | 27.3 |
| 2 | 0.35 | 26.6 |
| 3 | 0.35 | 21.1 |
| 4 | 0.40 | 22.9 |

The above data shows cellulose acetate to be an acceptable support for the membrane of the present invention, although the flux rates are somewhat small, particularly considering that the pressure drop used was almost twice that of the previous tests involving the use of polysulfone support.

It should be noted that a membrane made of cellulose acetate alone showed a flux of 2.3 ml/min but a separation factor of only 12.89.

EXAMPLE VI

To illustrate the stability of the multicomponent membrane of the present invention, a membrane which was prepared according to the method set forth in Example I above was exposed to either carbon dioxide or methane gas at pressures ranging from 25 to 50 psi and temperatures ranging from ambient to 70° C. or both with and without the presence of water in the feed gas. The membranes were subjected to this gas for a period well in excess of six months. At the end of this six-month period, the membranes still maintained the ability to effect the separation of gases while maintaining a steady rate flux.

What is claimed is:

1. A multicomponent membrane useable for the separation of components of a fluid feed mixture comprising a mixture of a glycol plasticizer having a molecular weight of from about 200 to about 600 and an organic polymer comprised of silicone rubber cast on a porous polymeric support, said porous polymeric support having a ratio of total surface area to total pore cross-sectional area of from 5:1 to 900:1 and said membrane comprising from 5 to 50 wt. % of said glycol plasticizer.

2. The multicomponent membrane as set forth in claim 1 in which said glycol plasticizer possesses a high boiling point and a low partial pressure, said glycol plasticizer being uniformly dispersed as an emulsion in said organic polymer or in homogeneous phase as a solution with said organic polymer.

3. The multicomponent membrane as set forth in claim 1 in which said porous support comprises polysulfone.

4. The multicomponent membrane as set forth in claim 1 in which said porous support comprises cellulose acetate.

5. The method as set forth in claim 4 in which said casting is effected by pouring or spreading said emulsion or solution on said porous support.

6. The multicomponent membrane as set forth in claim 1 wherein said glycol plasticizer is present in an amount of from 20 to 50 wt. %.

7. A method for the maanufacture of a multicomponent membrane comprising a glycol plasticizer having a molecular weight of from about 200 to about 600 and an organic polymer comprised of silicone rubber on a porous polymeric support which comprises: (a) forming an emulsion or a solution of said glycol plasticizer with said organic polymer in a suitable solvent; (b) casting said emulsion or solution on said porous support to form a multicomponent membrane, said support having a ratio of total surface area to total pore cross-sectional area of from 5:1 to 900:1; and (c) curing said membrane at an elevated temperature for a time sufficient to evaporate substantially all of said solvent, said glycol plasticizer being present in said emulsion or solution in an amount sufficient to yield a membrane comprised of from 5 to 50 wt. % of said glycol plasticizer upon curing of said membrane.

8. The method as set forth in claim 7 in which said porous support comprises polysulfone.

9. The method as set forth in claim 7 in which said porous support comprises cellulose acetate.

10. The method as set forth in claim 7 in which said suitable solvent comprises trifluorotrichloroethane which is liquid at standard temperatures and pressures.

11. The method as set forth in claim 7 in which said emulsion or solution is degassed prior to casting by exposure of said emulsion or solution to at least a partial vacuum.

12. The method as set forth in claim 7 wherein said glycol plasticizer is present in an amount of from 20 to 50 wt. %.

13. A process for separating a first fluid component from a fluid feed mixture comprising a first component and a second component by contacting said fluid feed mixture with the upstream face of a multicomponent membrane comprising a mixture of a glycol plasticizer having a molecular weight of from about 200 to about 600 and an organic polymer comprised of silicone rubber on a porous polymeric support, said support having a ratio of total surface area to total pore cross-sectional area of from about 5:1 to about 900:1 at separation conditions and said membrane comprising from about 5 to about 50 wt. % of said glycol plasticizer, said first component in said feed mixture having a greater steady state permeability than said second component and recovering the permeate which emanates from the downstream face of said membrane said permeate comprising a fluid product mixture in which the proportion of said first component to second component is greater than the proportion of first component to second component in said fluid feed mixture.

14. The process as set forth in claim 13 in which said glycol plasticizer has a high boiling point and a low partial pressure, said glycol plasticizer being uniformly dispersed as an emulsion in said organic polymer or as a solution with said organic polymer.

15. The process as set forth in claim 13 in which said porous support comprises polysulfone.

16. The process as set forth in claim 13 in which said porous support comprises cellulose acetate.

17. The process as set forth in claim 13 in which said separation conditions include ambient temperature and a pressure in the range of from about 10 to about 500 pounds per square inch gauge.

18. The process as set forth in claim 13 wherein said glycol plasticizer is present in an amount of from 20 to 50 wt. %

* * * * *